June 19, 1923.
I. DAVIS
CLOSURE FOR MILK BOTTLES
Filed May 6, 1922
1,459,443
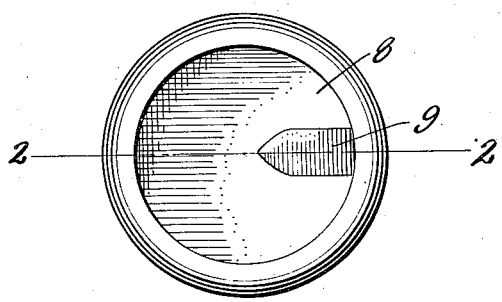
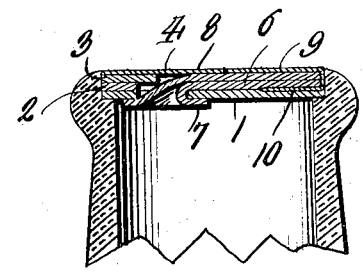
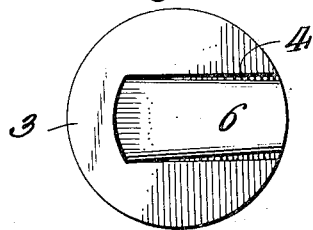
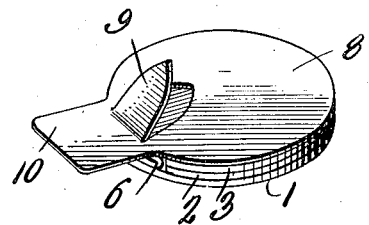
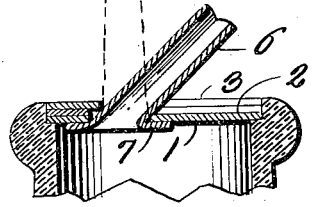
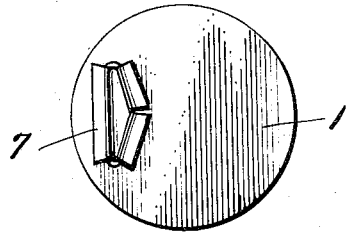
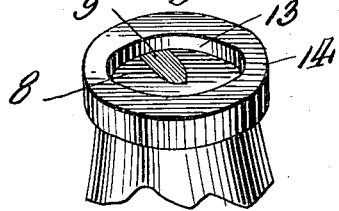
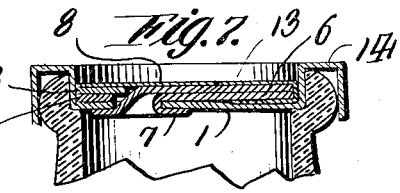
Inventor
Ida Davis
By Richard B. Owen
Attorney
WITNESSES
Guy M. Spring
Chas. J. Smith Patented June 19, 1923.

1,459,443

UNITED STATES PATENT OFFICE.

IDA DAVIS, OF SAN ANTONIO, TEXAS.

CLOSURE FOR MILK BOTTLES.

Application filed May 6, 1922. Serial No. 558,925.

*To all whom it may concern:*

Be it known that I, IDA DAVIS, a citizen of the United States, residing at San Antonio, in the county of Bexar and State of Texas, have invented certain new and useful Improvements in Closures for Milk Bottles, of which the following is a specification.

This invention relates to closures for milk bottles and the like and the primary object of my invention is to provide a milk bottle lid or closure, with positive and reliable means, in a manner to be hereinafter set forth, whereby the lid or closure can be adjusted so as to be used as a spout whereby the milk bottle may be used similar to a milk or cream pitcher.

A further object of this invention is to so accomplish the above result by a simple, durable and inexpensive milk bottle attachment that can be easily and quickly placed in position to close the milk bottle when the same is not in use, thereby preventing the contents of the milk bottle from being contaminated or soiled by insects and foreign matter and an attachment which may be easily adjusted to form a spout when it is desired to pour the contents from the bottle.

With the above and numerous other objects in view, the invention resides in certain novel features of construction, and the combination and arrangement of parts as will be hereinafter more fully described and claimed.

In the drawing:—

Figure 1 is a top plan showing the closure in the neck of a milk bottle,

Figure 2 is a section taken substantially on the line 2—2 of Figure 1,

Figure 3 is a perspective of the closure,

Figure 4 is a top plan of the closure showing the top layer removed,

Figure 5 is a vertical section through the closure with the top layer removed and the spout partially raised to an operative position.

Figure 6 is a bottom plan of the closure,

Figure 7 is a section through a modified form of the closure, and

Figure 8 is a perspective thereof showing the same attached to a milk bottle.

Referring to the drawing in detail it will be seen that the closure is preferably constructed of a plurality of layers of material such as paper. The bottom layer 1 is in the form of a disk and has an opening adjacent one edge thereof. Two other layers 2 and 3 are positioned on top of the bottom layer 1 and are horse-shoe in shape such as is disclosed to advantage in Figure 4, that is are provided with transverse openings 4 extending from one edge. These openings 4 are in registry with the opening in the bottom layer 1. The openings 4 in the layers 2 and 3 form a pocket for the tubular spout member 6 which is adapted to be folded and situated therein as is shown to advantage in Figure 2. This tubular spout member 6 is provided with flanges 7 at its lower end which projects through the opening in the disk or bottom layer 1 and are glued or otherwise attached thereto.

A top or closure layer 8 is situated on top of the layer 3 and has a circular body portion having a tab 9 cut therefrom and a peripheral tab 10 formed thereon. The tab 10 is adapted to be folded and situated between the layers 2 and 1 as shown to advantage in Figure 2. When the closure is assembled as shown in Figure 2, it will be seen that the tab 9 is grasped in the fingers and pulled thereby removing the closure from the milk bottle. This upper or top layer 8 may then be removed if desired and the closure placed back in the bottle so that the spout 6 may be used as is illustrated in dotted lines in Figure 5. If desired, however, the closure layer 8 may be retained in engagement with the other layer and placed back in position by folding the spout and situating the parts as shown in Figure 2.

In Figures 7 and 8 I have shown a slightly modified form of the invention which differs in that the bottom disk member is provided with a flange 13 which extends upwardly and seats in the neck of the bottle and is provided with an overhanging portion 14.

The two modifications of my invention have been disclosed only by way of example and it is to be understood that numerous changes in form, construction, and in the combination and arrangement of parts may be resorted to without departing from the spirit of the invention as hereinafter claimed.

Having thus described my invention what I claim as new is:—

1. A device of the class described formed from layers of material, the bottommost layer being provided with an opening, the other layer being provided with a socket registering with the opening in the bottom layer, and a foldable spout disposed when folded in the socket and having one end thereof in registry with the opening and fixed to the bottom layer.

2. A device of the class described formed from a plurality of layers of material, the bottom layer being provided with an opening, the intermediate layer being provided with a socket registering at one end with the opening in the bottom layer, a foldable spout disposed in the socket and having one end registering with the opening and fixed to the bottom layer, and the top layer having a tab disposed between the other two layers whereby the same may be hinged to an open position so that the spout may be extended in the manner and for the purpose specified.

In testimony whereof I affix my signature in presence of two witnesses.

IDA DAVIS.

Witnesses:
W. E. ENGEL,
WILL A. MORRISS.